(No Model.)

S. J. WOOD.
COMBINED ANTI RATTLER AND NUT LOCK FOR THILL COUPLINGS.

No. 392,249. Patented Nov. 6, 1888.

WITNESSES.
Frank G. Parker.
Matthew M. Blunt.

INVENTOR,
Samuel J. Wood.

United States Patent Office.

SAMUEL J. WOOD, OF SOMERVILLE, MASSACHUSETTS.

COMBINED ANTI-RATTLER AND NUT-LOCK FOR THILL-COUPLINGS.

SPECIFICATION forming part of Letters Patent No. 392,249, dated November 6, 1888.

Application filed July 2, 1888. Serial No. 278,839. (No model.)

*To all whom it may concern:*

Be it known that I, SAMUEL J. WOOD, of Somerville, in the county of Middlesex and State of Massachusetts, have invented certain new and useful Improvements in Combined Anti-Rattlers and Nut-Locks for Thill-Couplings, of which the following, taken in connection with the accompanying drawings, is a specification.

My invention relates to that class of thill-couplings in which the thill is attached to the axle-tree by means of a thill-iron, pivot-bolt clip, and tie-plate, the object being to so form and attach to this well-known device a plate of spring metal that shall serve the double purpose of preventing all rattling and of securely locking the bolt-nuts of the clip. This object I attain by the mechanism shown in the accompanying drawings, in which—

Figure 1:
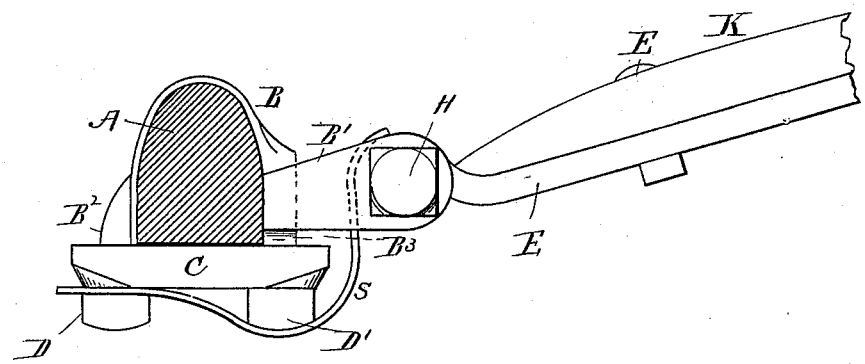
Figure 2:
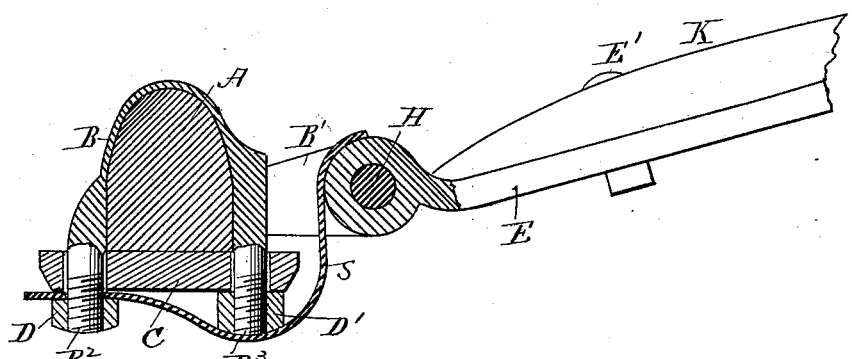

Figure 1 is a side elevation of my device as it appears when applied to the thill-coupling, and Fig. 2 is a vertical section of the same.

In the drawings, A represents a section of an axle-tree, to which the clip B is attached by means of the extensions $B^2$ $B^3$, said extensions being, in fact, screw-bolts, upon which the tie-plate C fits, and serves in connection with the nuts D D' to hold the clip and its forked arm B' firmly to the axle-tree A. The thill K is bolted to the thill-iron E by a bolt, E'. The thill-iron E is connected to the arm B' on the clip B by a pivot-bolt, H.

My improvement consists in the piece of plate metal S. This part S is made of spring-steel, and is bent as shown. The rear end of the spring-plate S is perforated to admit of the passage of the bolt-extension $B^2$, and is held in place by the said bolt-extension $B^2$ and the nut D. The spring-plate passes from under the nut D, over the nut D', and thence upward and forward, so as to closely fit and bear with considerable pressure against the rear end of the thill-iron E.

The spring-plate S is so formed and applied that it will exert a firm holding-pressure upon the inner side of the nut D, and also upon the outer side of the nut D', so as to prevent them from turning, becoming loose, and eventually falling off. The reaction from the pressure of the spring-plate S on the nuts D and D' exerts a pressure upon the rear side of the thill-iron E, thus preventing rattling.

Having thus described my invention, what I claim, and desire to secure by Letters Patent, is—

In a thill-coupling, the combination of the clip B, tie-plate C, nuts D D', and thill-iron E with the spring-plate S, so formed and attached that its upper end exerts a spring-pressure against the thill-iron H and its lower portion a locking-pressure against the nuts D D', all operating together substantially as described, and for the purpose set forth.

SAMUEL J. WOOD.

Witnesses:
FRANK G. PARKER,
MATTHEW M. BLUNT.